United States Patent
Komatsu

(10) Patent No.: US 11,463,913 B2
(45) Date of Patent: Oct. 4, 2022

(54) RADIO BASE STATION, RADIO COMMUNICATION SYSTEM, AND FLOW CONTROL METHOD

(71) Applicant: NEC CORPORATION, Tokyo (JP)

(72) Inventor: Masahiro Komatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 64 days.

(21) Appl. No.: 16/890,313

(22) Filed: Jun. 2, 2020

(65) Prior Publication Data

US 2020/0389819 A1    Dec. 10, 2020

(30) Foreign Application Priority Data

Jun. 6, 2019 (JP) .............................. JP2019-105848

(51) Int. Cl.
*H04W 28/10* (2009.01)
*H04W 28/02* (2009.01)
*H04W 28/14* (2009.01)

(52) U.S. Cl.
CPC ....... *H04W 28/10* (2013.01); *H04W 28/0278* (2013.01); *H04W 28/14* (2013.01)

(58) Field of Classification Search
CPC . H04W 28/10; H04W 28/0278; H04W 28/14; H04L 1/1835; H04L 47/722; H04L 47/30
See application file for complete search history.

(56) References Cited

U.S. PATENT DOCUMENTS

| | | | |
|---|---|---|---|
| 2021/0007011 A1* | 1/2021 | Zhu | ........................ H04W 28/12 |
| 2021/0105753 A1* | 4/2021 | Zhang | ................... H04L 5/0048 |
| 2022/0015125 A1* | 1/2022 | Liu | .................... H04W 72/1289 |

FOREIGN PATENT DOCUMENTS

WO      2019/031541 A1    2/2019

* cited by examiner

*Primary Examiner* — Omer S Mian

(57) ABSTRACT

The radio base station includes a central node and a distributed node. The central node at least implements the functions of a PDCP layer. The distributed node at least implements the functions of a RLC layer. The distributed node transmits, to the central node, flow control information for performing flow control per each group of a plurality of user terminals. The central node performs flow control of data to be transmitted to the bearers assigned to a plurality of user terminals belonging to the each group, based on the flow control information.

8 Claims, 12 Drawing Sheets

| | | | Bits | | | | | Octets | Number of |
|---|---|---|---|---|---|---|---|---|---|
| 7 | 6 | 5 | 4 | 3 | 2 | 1 | 0 | | |
| PDU Type (=x) | | | | Data rate Ind. UEG | Spare | Spare | Spare | | 1 |
| UEG Number | | | | | | | | | X |
| number of UE | | | | | | | | | X |
| UE ID #1 | | | | | | | | | X |
| . | | | | | | | | | X |
| UE ID #n | | | | | | | | | X |
| Padding | | | | | | | | | 0-3 |

| | Bits | | | | | | | | Number of Octets |
|---|---|---|---|---|---|---|---|---|---|
| 7 | 6 | 5 | 4 | 3 | 2 | 1 | 0 | | |
| PDU Type (=x) | | | Data rate Ind. UEG | Spare | Spare | Spare | | 1 | |
| UEG Number | | | | | | | | x | |
| Desired buffer size for the data radio bearer for UEG | | | | | | | | 4 | |
| Desired Data Rate for UEG | | | | | | | | 0 or 4 | |
| Padding | | | | | | | | 0-3 | |

Fig.8

| Bits | | | | | | | | Number of Octets |
|---|---|---|---|---|---|---|---|---|
| 7 | 6 | 5 | 4 | 3 | 2 | 1 | 0 | |
| PDU Type (=x) | | | Data rate Ind. UEG | Spare | Spare | Spare | 1 |
| UEG Number | | | | | | | | x |
| number of UE | | | | | | | | x |
| UE ID #1 | | | | | | | | x |
| UE ID #n | | | | | | | | x |
| Padding | | | | | | | | 0-3 |

Fig.9

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Highest Transmitted NR PDCP SN Ind | Highest Delivered NR PDCP SN Ind | Final Frame Ind | Lost Packet Report | 1 |
| Spare | | | | Data rate Ind. | Retransmitted NR PDCP SN Ind | Delivered Retransmitted NR PDCP SN Ind | Cause Report | 1 |
| Desired buffer size for the data radio bearer | | | | | | | | 4 |
| Desired Data Rate | | | | | | | | 0 or 4 |
| Number of lost NR-U Sequence Number ranges reported | | | | | | | | 0 or 1 |
| Start of lost NR-U Sequence Number range | | | | | | | | 0 or (6* Number of reported lost NR-U SN ranges) |
| End of lost NR-U Sequence Number range | | | | | | | | |
| Highest successfully delivered NR PDCP Sequence Number | | | | | | | | 0 or 3 |
| Highest transmitted NR PDCP Sequence Number | | | | | | | | 0 or 3 |
| Cause Value | | | | | | | | 0 or 1 |
| Successfully delivered retransmitted NR PDCP Sequence Number | | | | | | | | 0 or 3 |
| Retransmitted NR PDCP Sequence Number | | | | | | | | 0 or 3 |
| Padding | | | | | | | | 0-3 |

Fig.12

RADIO BASE STATION, RADIO COMMUNICATION SYSTEM, AND FLOW CONTROL METHOD

BACKGROUND

Technical Field

The present invention relates to a radio base station, a radio communication system, and a flow control method.

Background Art

In the Third Generation Partnership Project (3GPP), the standardization of a successor system of Long Term Evolution (LTE), referred to as "Fifth Generation (5G) New Radio (NR)", is in progress.

In 5G, a configuration to include a central node (Central Unit (CU)) and a distributed node (Distributed Unit (DU)), which extends from the location where the central node is installed and is located remotely, is under study as a configuration for a radio base station (gNodeB).

Such a configuration of a radio base station is referred to as "Centralized Radio Access Network (C-RAN)-based" configuration. A C-RAN-based radio base station anticipates a variety of functional splits.

For example, there is Higher Layer Split (HLS), in which the Packet Data Convergence Protocol (PDCP) layer is provided in the central node CU, and layers lower than the Radio Link Control (RLC) layer are provided in the distributed node DU.

The HLS configuration is designed so that the RLC layer, the Medium Access Control (MAC) layer, the Physical (PHY) layer, and Radio Frequency (RF) are provided in distributed nodes DU. For example, FIG. 2 of Patent Literature 1 discloses a radio base station with the HLS configuration.

[PTL 1] WO 2019/031541

As mentioned above, in 3GPP, the 5G functional split between the central node CU and the distributed node DU has been reviewed. In HLS, functional split is applied between the PDCP layer and the RLC layer, and an F1 interface is set forth for the interface between the central node CU and the distributed node DU.

The central node CU receives a downlink data, as input, from the core network (CN). The central node CU accumulates (buffers) the downlink data in the PDCP layer. The central node CU distributes the buffered downlink data to the distributed node DU, via the F1 interface.

The distributed node DU accumulates (buffers) the distributed downlink data in the RLC layer. The buffered data is delivered to layer 1 (L1) or lower layers, according to the MAC layer's scheduler.

When the downlink data is distributed from the central node CU to the distributed node DU, a flow control for controlling an amount of data between the nodes appropriately is performed. To be more specific, the distributed node DU notifies an allowable data amount of each bearer to the central node CU. The central node CU performs the flow control based on the allowable data amount of each bearer that is notified.

As explained above, in the 5G HLS configuration, the flow control is performed on a per bearer basis. The allowable data amount for each bearer is determined by the distributed node DU, for example, in the following manner.

For the central node CU or user equipment (UE), the distributed node DU divides, proportionally, the free buffer size in the RLC layer by each bearer's throughput, and determines the allowable data amount within a range from a predetermined minimum value to a maximum value.

Alternatively, the distributed node DU may notify an allocated size (allocated buffer size), instead of the free buffer size, to the central node CU. Note that the allocated buffer size is the sum value of the buffer size that is already occupied and the free buffer size, for each bearer. Alternatively, the distributed node DU may notify the data rate (data transmission rate) for each bearer, to the central node CU.

FIG. 12 shows an example of the format for use for notifying the allowable data amount. The distributed node DU notifies the allowable data amount, together with the status of data transmission.

In the example of FIG. 12, the allowable data amount is set to the buffer size (desired buffer size for the data radio bearer) or the data rate (desired data rate), and the allowable data amount is notified from the distributed node DU to the central node CU.

The central node CU performs the flow control of the downlink data to be distributed to the distributed node DU with the notified allowable data amount (the buffer size or the data rate) as an upper limit. For example, the central node CU adjusts a size of the downlink data to be distributed to the distributed node DU.

Here, data buffers in the distributed node DU accumulate the downlink data of a plurality of user equipment (UEs), and a plurality of bearers. In this case, buffers are oftentimes shared by each UE, and each bearer, for the purpose of using buffers efficiently, instead of reserving buffers for each bearer. To be more specific, an area for buffering data for a plurality of bearers is shared for one UE, or a buffering area is shared by a plurality of UEs and a plurality of bearers.

Furthermore, when a plurality of UEs and a plurality of bearers share a buffer, buffer size for accumulating downlink data is often limited, on a per UE basis, so as to prevent data for a specific UE from occupying the shared buffer. Given this situation, when the amount of data that remains in a buffer changes in a specific bearer of a specific UE, the allowable data amount (buffer amount) for other bearers sharing the buffer or all bearers related to other UEs changes.

As described above, the flow control between the central node CU and the distributed node DU is currently executed on a per bearer basis. Therefore, the distributed node DU needs to instruct the flow control on a per bearer basis (i.e., the distributed node DU needs to notify the allowable data amount on a per bearer basis). As a result of this, since a large number of messages for these instructions are sent and received between the central node CU and the distributed node DU, in a short time, the traffic load between the nodes increases.

A main example object of the present invention is to provide a radio base station, a radio communication system, and a flow control method, which contribute to reducing the increase of traffic load between the central node and the distributed node.

SUMMARY

According to a first example aspect of the present invention, there is provided a radio base station including a central node, which at least implements the functions of a Packet Data Convergence Protocol (PDCP) layer; and a distributed node, which at least implements the functions of a Radio Link Control (RLC) layer; wherein the distributed node transmits flow control information for performing flow control per each group of a plurality of user terminals, to the central node; and the central node performs the flow control of data to be transmitted to the bearers assigned to the plurality of user terminals belonging to the each group, based on the flow control information.

According to a second example aspect of the present invention, there is provided a radio communication system, including a plurality of user terminals; and a radio base station, which provides radio connections to the plurality of user terminals; wherein the radio base station includes: a central node, which at least implements the functions of a Packet Data Convergence Protocol (PDCP) layer; and a distributed node, which at least implements the functions of a Radio Link Control (RLC) layer; wherein the distributed node transmits flow control information for performing flow control per each group of one or more user terminals, to the central node; and the central node performs the flow control of data to be transmitted to the bearers assigned to the plurality of user terminals belonging to the each group, based on the flow control information.

According to a third example aspect of the present invention, there is provided a flow control method in a radio communication system, including a central node, which at least implements the functions of a Packet Data Convergence Protocol (PDCP) layer, and a distributed node, which at least implements the functions of a Radio Link Control (RLC) layer, the method including the steps of: transmitting flow control information for performing flow control per each group of a plurality of user terminals, to the central node; and performing the flow control of data to be transmitted to the bearers assigned to the plurality of user terminals belonging to the each group, based on the flow control information.

According to each example aspect of the present invention, there are provided a radio base station, a radio communication system, and a flow control method that contribute to reducing the increase of traffic load between a central node and a distributed node. Note that, according to the present invention, instead of or together with the above advantageous effects, other advantageous effects may be brought about.

BRIEF DESCRIPTION OF THE DRAWINGS

FIG. 8 is a diagram for illustrating the operation of a flow control information generation section;

FIG. 9 is a diagram for illustrating the operation of a flow control information generation section;

FIG. 12 is a diagram to show an example of a format for use for notifying the allowable data amount.

DESCRIPTION OF THE EXAMPLE EMBODIMENTS

First, an overview of one example embodiment will be described. Note that, although reference signs are assigned to the drawings per element in the following overview, this is simply an example to help understand the overview, and the description of this overview is not intended to limit anything, in any way. Note that, in the specification and the drawings, elements that can be described in the same or similar terms will be assigned the same reference signs, and overlapping description may be omitted.

Figure 1:
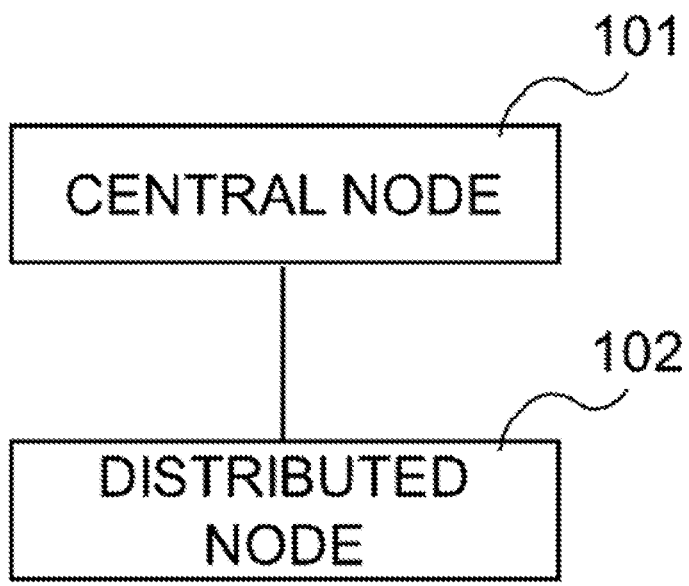
FIG. 1 is a diagram for illustrating an overview of one example embodiment.

The radio base station 100 according to one example embodiment includes a central node 101 and a distributed node 102 (see FIG. 1). The central node 101 at least implements the functions of the packet data convergence protocol (PDCP) layer. The distributed node 102 at least implements the functions of the radio link control (RLC) layer. The distributed node 102 transmits, to the central node 101, flow control information for performing flow control per group that includes a plurality of user terminals. The central node 101 controls the flow of data to transmit to the bearers assigned to a plurality of user terminals belonging to each group, based on the flow control information.

As described above, in the existing C-RAN-based radio base station, the allowable data amount on per bearer basis is notified from the distributed node to the central node. Also, each bearer's buffer area is oftentimes shared, and, if an allowable data amount that pertains to a specific user terminal changes in a buffer that is shared, the allowable data amount that pertains to other user terminals will also change likewise. Consequently, a very large number of messages have to be notified from the distributed node to the central node.

To address this problem, the radio base station 100 divides a plurality of buffer-sharing user terminals into groups, and the allowable data amount for each group is transmitted and received between the distributed node 102 and the central node 101. The allowable data amount of each group is notified to the central node 101, so that, even when the allowable data amount varies a little among the user terminals within the same group, unless the allowable data amount of the whole group does change, there is no need to transmit messages from the distributed node 102 to the central node 101. As a result of this, the increase of traffic load between the central node and the distributed node is reduced. That is, when using an existing radio base station, a large number of signals (messages) for implementing flow control are transmitted and received between the central node and the distributed node. According to the present disclosure, it is possible to reduce the amount of signals related to flow control by controlling flows for every multiple user terminals (multiple bearers).

Hereinafter, a specific example embodiment will be described in greater detail with reference to the accompanying drawings.

First Example Embodiment

The first example embodiment will be described in greater detail with reference to the accompanying drawings.

Figure 2:
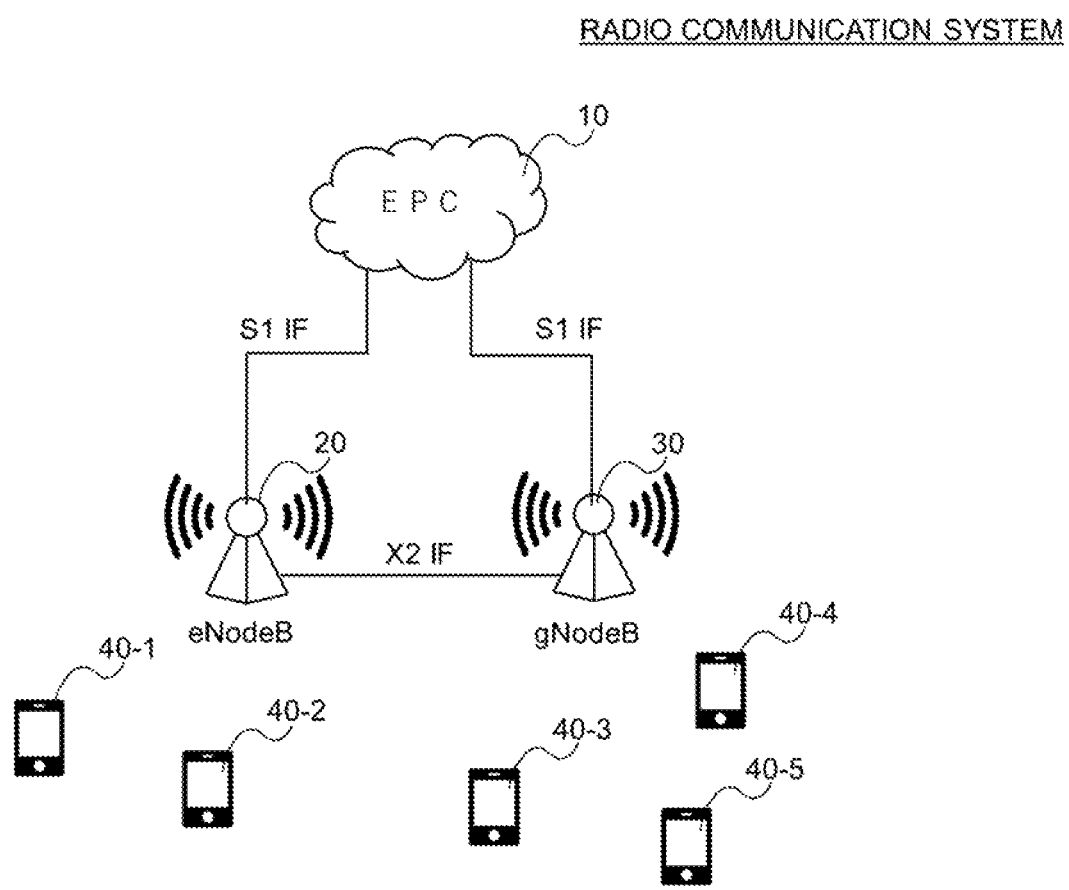
FIG. 2 is a diagram to show an example of a schematic structure of a radio communication system according to a first example embodiment.

FIG. 2 is a diagram to show an example of a schematic structure of a radio communication system according to the first example embodiment. The radio communication system shown in FIG. 2 employs the so-called non-standalone (NSA) scheme, which covers LTE and its successor systems, including 5G NR. However, this is not intended to limit the scheme of the radio communication system, and the radio communication system according to the first example embodiment may also employ the standalone (SA) scheme, which is implemented with 5G NR alone.

Referring to FIG. 2, the radio communication system according to the first example embodiment includes a core network 10, a first radio base station 20, a second radio base station 30, and a plurality of user terminals (user equipment (UEs)) 40-1 to 40-5.

Note that, in the following description, when there is no special reason to distinguish between user terminals 40-1 to 40-5, the user terminals 40-1 to 40-5 will be simply referred to as "user terminals 40". The same will apply to notations relating to other configurations.

The core network 10 is also referred to as evolved packet core (EPC), and is comprised of devices (nodes) such as a mobility management entity (MME), a serving gateway (S-GW), and a packet data network gateway (P-GW).

The first radio base station 20 is a radio base station (eNodeB) that conforms to LTE (including LTE-Advanced) standards. The first radio base station 20 is connected with the core network 10 via an S1 interface.

A second radio base station 30 is a radio base station (gNodeB) that conforms to 5G NR standards. The second radio base station 30 is connected with the core network 10 via the S1 interface. The first radio base station 20 and the second radio base station 30 are connected via an X2 interface.

The user terminals 40 perform radio communication with the first radio base station 20 and the second radio base station 30. The user terminals 40 will be exemplified with mobile terminal devices such as smartphones, mobile phones, gaming machines and tablets. Alternatively, the user terminals 40 may be Internet of Things (IoT) terminals and machine type communication (MTC) terminals that transmit radio waves and so forth. However, this is not intended to limit the user terminals 40 to these examples. "User terminals" as used in the present disclosure may be any devices that transmit radio waves.

Note that, it is obvious that the configuration shown in FIG. 2 is simply an example and is not intended to limit the number of user terminals 40 and the like to be included in the system.

Figure 3:
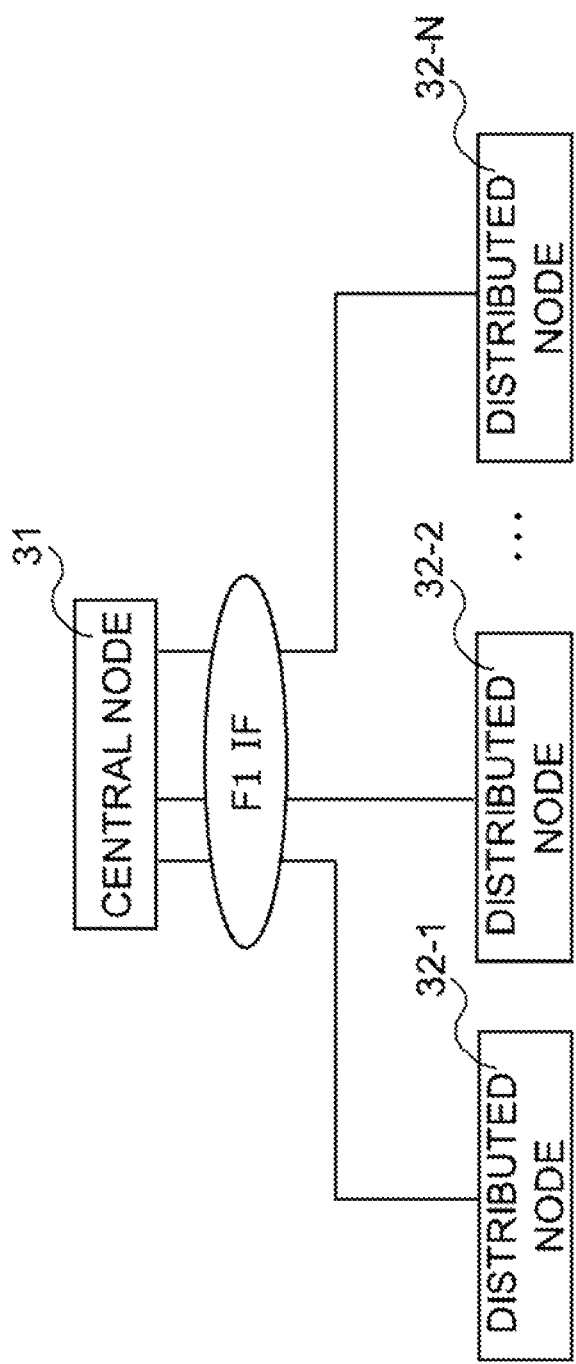
FIG. 3 is a diagram to show an example of a structure of a second radio base station according to the first example embodiment.

FIG. 3 is a diagram to show an example of the structure of the second radio base station 30 according to the first example embodiment. The second radio base station 30 includes a central node 31 and a plurality of distributed nodes 32-1 to 32-N (where N is a positive integer, and the same will apply hereinafter).

The second radio base station 30 has an HLS configuration, in which the central node 31 at least implements the functions of the PDCP layer, and the distributed nodes 32 at least implement the functions of the radio link control (RLC) layer.

Note that the second radio base station 30 may include devices (nodes) other than the central node 31 and the distributed nodes 32. Furthermore, the structure shown in FIG. 3 is simply an example, and is not intended to limit the number of central nodes 31, distributed nodes 32 and/or the like. The second radio base station 30 only needs to include at least one or more central nodes 31 and at least one or more distributed nodes 32.

The central node 31 and the distributed nodes 32 are connected via an F1 interface.

Figure 4:
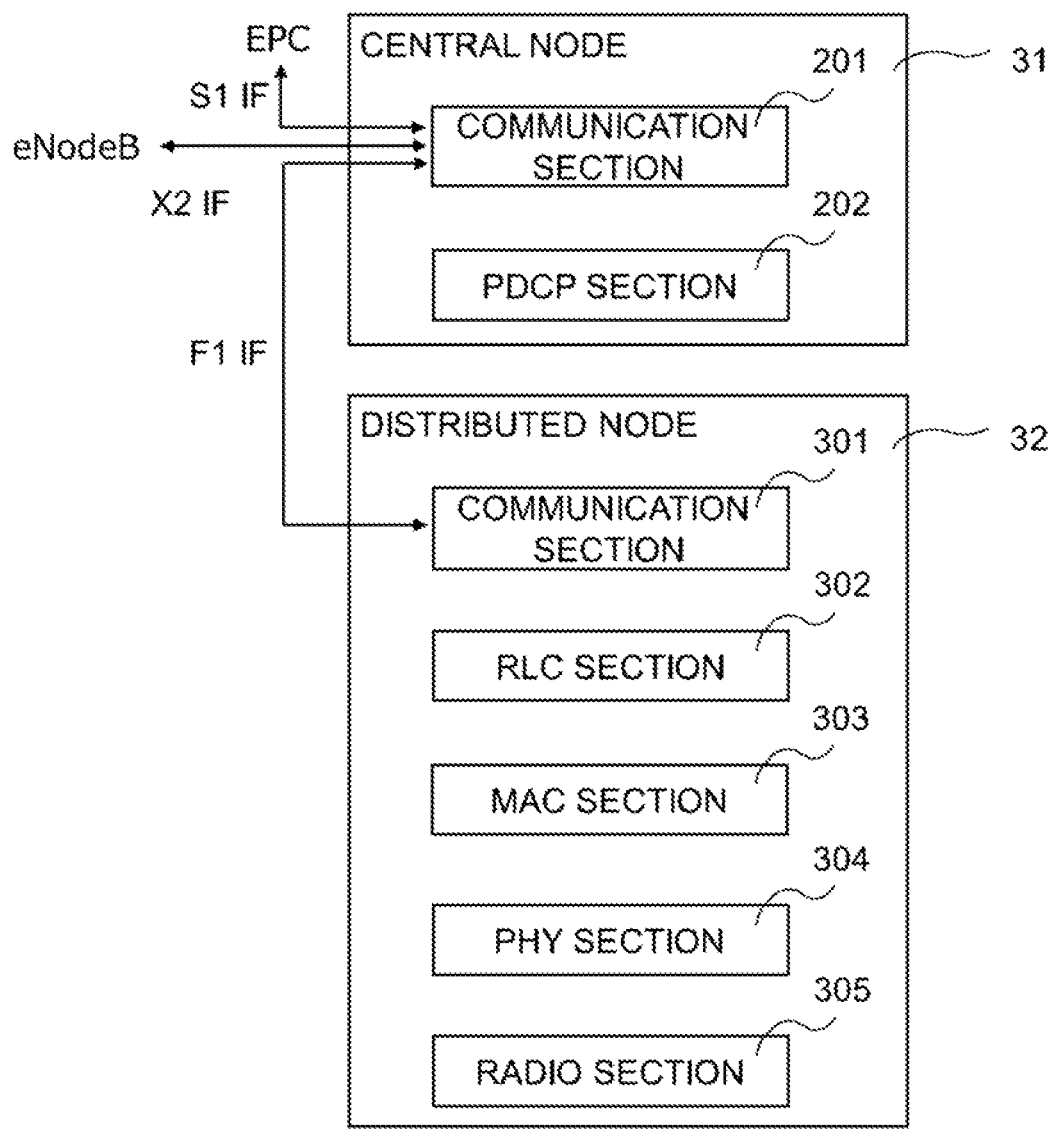
FIG. 4 is a diagram to show an example of a processing structure of the second radio base station according to the first example embodiment.

FIG. 4 is a diagram to show an example of the processing structure (processing modules) of the second radio base station 30 according to the first example embodiment. The central node 31 of the second radio base station 30 is comprised of a communication section 201 and a PDCP section 202.

The communication section 201 communicates with the core network 10 through the S1 interface, communicates with the first radio base station 20 through the X2 interface, and communicates with the distributed nodes 32 through the F1 interface.

The PDCP section 202 implements the functions of the PDCP layer. The PDCP section 202, for example, compresses, decompresses, and encrypts Internet protocol (IP) packet headers.

The distributed nodes 32 includes a communication section 301, an RLC section 302, a MAC section 303, a PHY section 304, and a radio (radio frequency (RF)) section 305.

The communication section 301 communicates with the central node 31 through the F1 interface.

The RLC section 302 implements RLC layer functions. The RLC section 302, for example, controls the retransmission of packets, detects overlaps, adjusts the order/alignment, and so forth.

The MAC section 303 implements MAC layer functions. The MAC section 303, for example, allocates radio resources, maps data, and so on.

The PHY section 304 implements the radio physical layer (L1). The PHY section 304, for example, modulates and encodes transmission data, controls antennas, and so on.

The radio section 305 is a radio transmitting/receiving module or the like.

As shown in FIG. 3 and FIG. 4, the second radio base station 30 is comprised of a central node 31 and a distributed node 32. The central node 31 distributes the data acquired from the core network 10 to the distributed node 32. The central node 31 implements flow control based on information notified from the distributed node 32.

In the present disclosure, information for flow control notified from the distributed node 32 to the central node 31 will be referred to as "flow control information". The distributed node 32 notifies the flow control information to the central node 31 to ensure that an appropriate amount of data is distributed from the central node 31.

Downlink data from the core network 10 is input to the central node 31. The central node 31 buffers the downlink data in the PDCP section 202.

The PDCP section 202 distributes (transmits) the buffered downlink data to the distributed node 32 via the F1 interface.

The distributed node 32 buffers this acquired downlink data in the RLC section 302.

Figure 5:
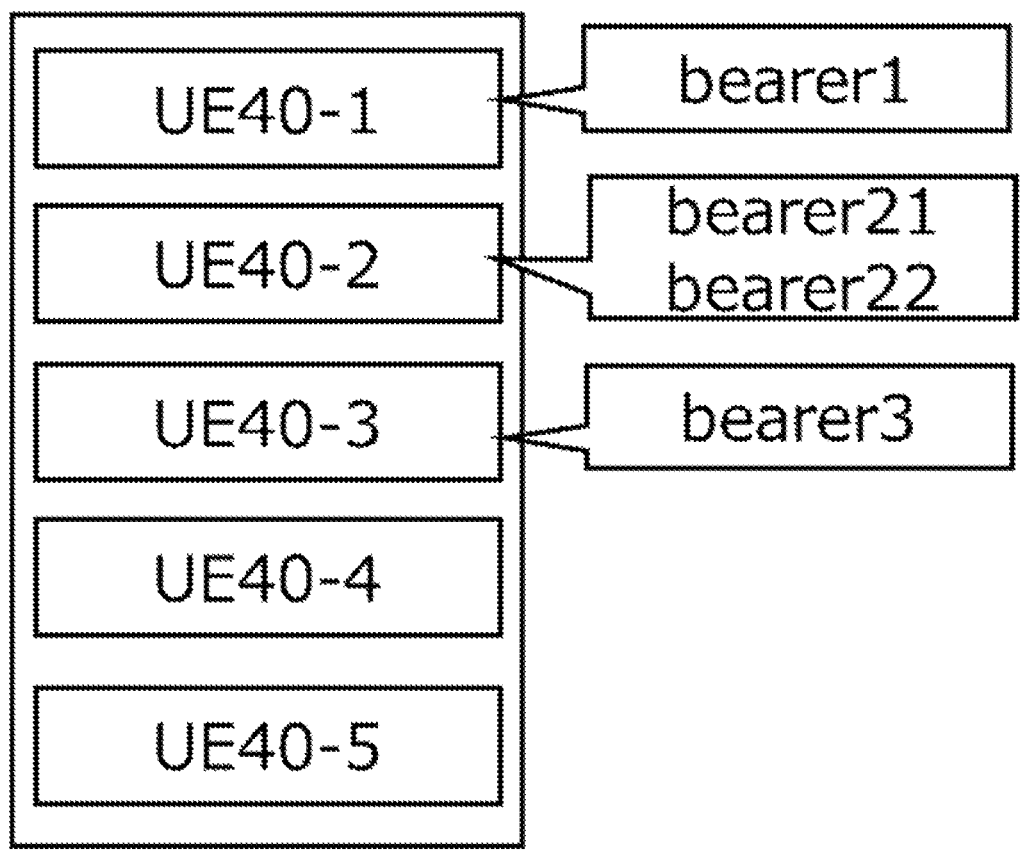
FIG. 5 is a diagram for illustrating a buffer provided in a distributed node.

For example, as shown in FIG. 5, the RLC section 302 includes a buffer (hereinafter referred to as the "RLC buffer") for storing the data to be transmitted to the bearers assigned to user terminals 40. The RLC buffer buffers the data (downlink data) to be transmitted from the bearers assigned to each user terminal 40.

As shown in FIG. 5, the distributed node 32 uses the same buffer as a data buffer for a plurality of user terminals 40. Note that, as shown in FIG. 5, one bearer may be assigned to the user terminals 40, or a plurality of bearers may be assigned to the user terminals 40.

The downlink data buffered in the RLC buffer is delivered to the PHY section 304 and the radio section 305, in order, following the scheduler of the MAC section 303. The radio section 305 transmits radio signals to the opposing user terminal 40.

Uplink data received from the opposing user terminal 40 is distributed from the distributed node 32 to the central node 31 via the PHY section 304, the MAC section 303, and the RLC section 302. The central node 31 transmits the received uplink data to the core network 10, via the PDCP section 202.

The central node 31 controls the rate of transmission when forwarding data from the central node 31 to the distributed node 32 so as to prevent a buffer overflow (buffer overrun) in the distributed node 32 that receives downlink data. When distributing the downlink data to the distributed node 32, the central node 31 performs flow control so that an appropriate amount of data (an amount of data that does not cause an overflow of the buffer of the RLC section 302) is distributed.

At this time, the distributed node 32 transmits, to the central node 31, flow control information for implementing the flow control. To be more specific, the distributed node 32 transmits flow control information for performing flow control per group that includes a plurality of user terminals 40, to the central node 31. To be more specific, the distributed node 32 divides a plurality of buffer-sharing user terminals 40 into groups, and notifies the allowable data amount of each group, to the central node 31, as flow control information.

For example, as shown in FIG. 5, when the user terminals 40-1 to 40-5 share one buffer, these five user terminals 40 are subject to grouping.

Figure 6:
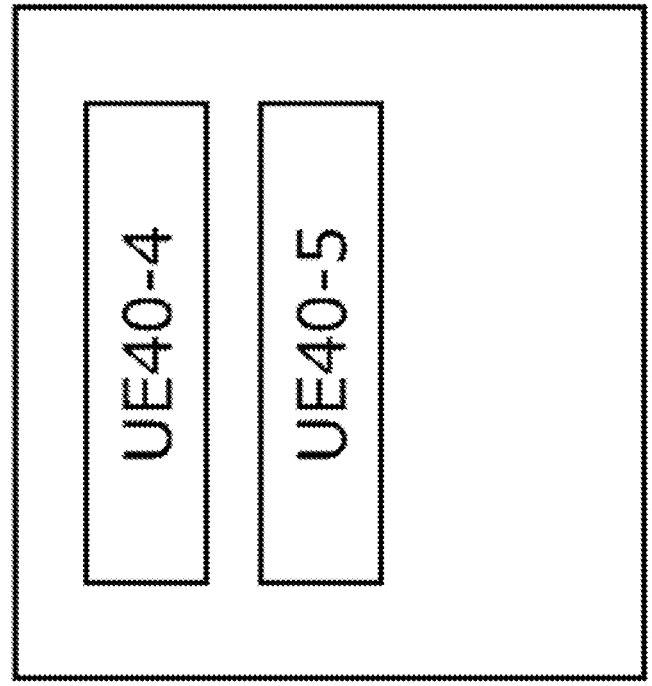
FIG. 6 is a diagram for illustrating flow control information.
Figure 6:
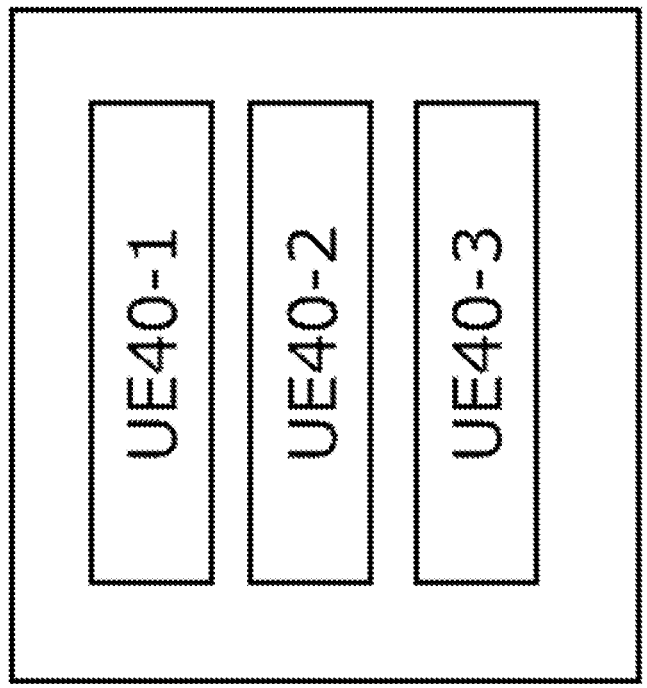

For example, the distributed node 32 groups the user terminals 40-1 to 40-3 into one group, and groups the user terminals 40-4 and 40-5 into another group (see FIG. 6).

Note that the user terminals 40 can be grouped based on a variety of rules and/or the like. For example, when the number of groups is determined in advance, the grouping may be performed so that the number of members belonging to each group is as equal as possible.

The distributed node 32 calculates the allowable data amount per group, and notifies the allowable data amount to the central node 31 as flow control information. For example, in the example of FIG. 6, the identification information "user equipment group (UEG) number=01" is assigned to group 1 of the user terminals 40-1 to 40-3, and the allowable data amount (buffer size, data rate, etc.) for this group 1 is notified to the central node 31 as flow control information.

Note that an allowable data amount refers to an amount of data that can be accepted by a group with members of a plurality of user terminals 40 (bearers assigned to user terminals 40). As described above, "buffer size" and "data rate" are shown as examples of allowable data amount. When a "buffer size" is selected as an allowable data amount, the amount of data represented by this buffer size is the amount of data that can be stored in the RLC buffer provided in the distributed node 32 (the amount of data that can be stored per group).

Alternatively, in the event a "data rate" is selected as an allowable data amount, if data is transmitted from the central node 31 to the distributed node 32 faster than this data rate, the RLC buffer will overflow. That is, when an allowable data amount is presented in the form of a "data rate", this allowable data amount shows the upper-limit data rate that is applicable to the transmission to the bearers assigned to the user terminals 40 included in a group.

If each group includes different members, the allowable data amount is also different for each group. For example, referring to the example of FIG. 6, the allowable data amounts of group 1 and group 2 are usually different. In this way, the distributed node 32 places information about the amounts of data that can be accepted by groups including a plurality of user terminals 40, as allowable data amounts, in flow control information, and transmits this information to the central node 31.

The central node 31 controls the flow of data to transmit to the bearers assigned to a plurality of user terminals 40 belonging to each group, based on the flow control information received. For the bearers of user terminals 40 belonging to the same group, the central node 31 transmits data to the distributed node 32 at the same data transmission rate for all.

For example, referring to the example of FIG. 6, for the bearers assigned to the user terminals 40-1 to 40-3, the central node 31 transmits data to the distributed nodes 32 at the same transmission rate.

Figure 7:
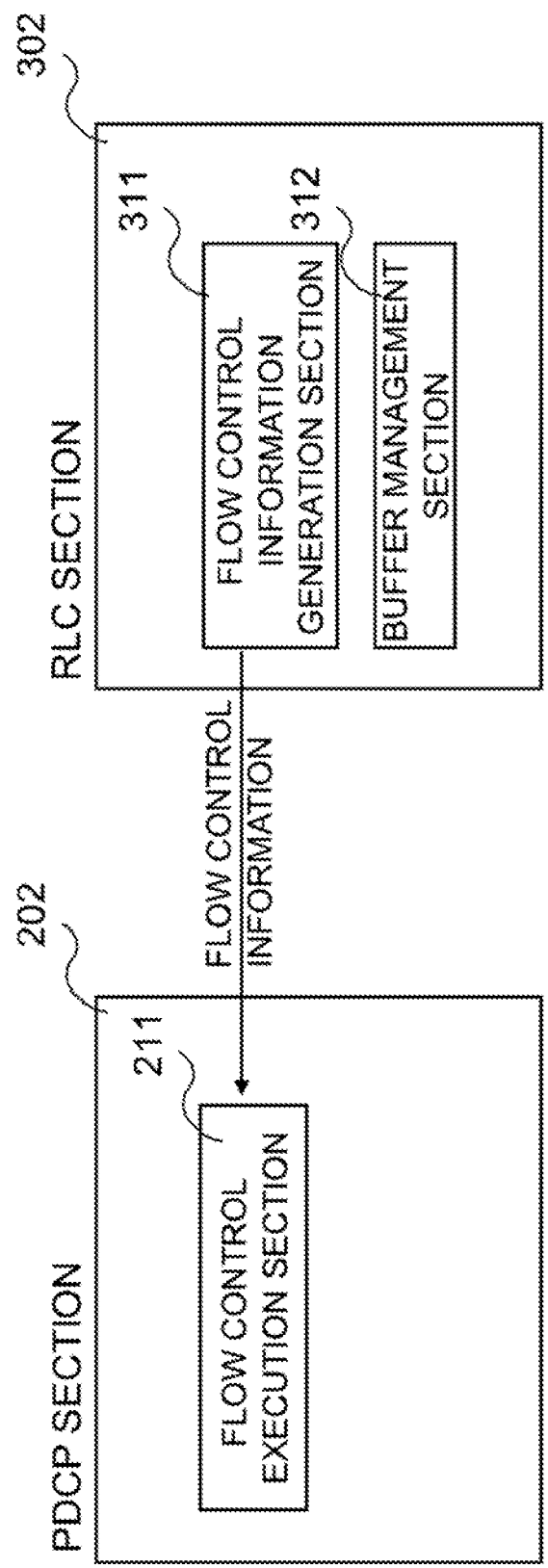
FIG. 7 is a diagram to show examples of submodules included in a PDCP section of a central node and an RLC section of a distributed node.

To implement the flow control, the PDCP section 202 of the central node 31 and the RLC section 302 of the distributed node 32 include submodules such as those shown in FIG. 7.

The PDCP section 202 of the central node 31 includes a flow control execution section 211. The flow control execution section 211 performs flow control per group (for every multiple user terminals 40), based on the "flow control information" notified from the distributed node 32.

The RLC section 302 of the distributed node 32 includes a flow control information generation section 311 and a buffer management section 312.

The flow control information generation section 311 generates flow control information.

The flow control information generation section 311 divides a plurality of user terminals 40 sharing the same buffer, into groups, following predetermined rules and/or the like. Here, assume that the flow control information generation section 311 performs the grouping as shown in FIG. 6.

Note that, regarding the grouping by the flow control information generation section 311, all user terminals 40 that are subject to processing in the RLC section 302 in one distributed node 32 may be made one group. For example, referring to FIG. 3, all the user terminals 40, for which the distributed node 32-1 provides radio connections, may be grouped into one group and all the user terminals 40, for which the distributed node 32-2 provides radio connections, may be grouped into another group.

Alternatively, the flow control information generation section 311 may perform the grouping depending on the types of user terminals 40 (for example, terminals such as smartphones, IoT terminals, etc.), types of services used by user terminals 40, and so forth.

Alternatively, when a plurality of central nodes 31 are connected to one distributed node 32, the flow control information generation section 311 may perform the grouping so that user terminals 40 belonging to different central nodes 31 (different PDCP sections 202) will belong to different groups.

Alternatively, as shown in FIG. 5, when one user terminal 40 is assigned a plurality of bearers, the flow control information generation section 311 may group these bearers into one group. That is, flow control may be performed so that a plurality of bearers are bundled.

The flow control information generation section 311 generates flow control information pertaining to each group. Details regarding the generation of flow control information will be described later.

The buffer management section 312 manages the RLC buffer, which has been described above.

The buffer management section 312 monitors the buffer occupancy per user terminal 40, and calculates the overall free capacity of the RLC buffer (free buffer size). Also, the buffer management section 312 calculates the throughput of each user terminal 40 (the throughput when data is transmitted from the RLC section 302 to the MAC section 303) from the variation of buffer occupancy among the user terminals 40.

The flow control information generation section 311 calculates the buffer size that can be assigned to each group, based on the values calculated in the buffer management section 312. For example, the flow control information generation section 311 calculates the buffer size that can be assigned to each group by dividing, proportionally, the overall free buffer size of the RLC buffer by the throughput of each group.

Note that, for the throughput of each group, the minimum value of throughput among the user terminals 40 that constitute each group may be selected, or the average value of throughput among the user terminals 40 may be used.

Next, the flow control information generation section 311 judges whether or not the buffer size calculated for each group is included in a predetermined range (a range determined by a minimum value and a maximum value). If a buffer size that is calculated is included in the predetermined range, the flow control information generation section 311 sets the buffer size calculated above, for the buffer size of the group.

If a buffer size that is calculated is not included in the predetermined range, the flow control information generation section 311 sets the minimum value or the maximum value for the buffer size of the group. If a buffer size smaller than the minimum value is calculated, the minimum value is used as the buffer size of the group. If a buffer size larger than the maximum value is calculated, the maximum value is used as the buffer size of the group.

The flow control information generation section 311 notifies the buffer size of each group to the central node 31 as the allowable data amount of each group (transmits flow control information).

For example, when the user terminals 40-1 to 40-5 are grouped as shown in FIG. 6, the flow control information generation section 311 calculates an allowable data amount for each of group 1 and group 2.

For example, the flow control information generation section 311 selects the minimum throughput among the throughputs of the members (user terminals 40) of each group as a representative value for the throughput of the group.

Referring to the example of FIG. 6, if the throughput of the user terminal 40-1 is smaller than the throughput of the user terminals 40-2 and 40-3, the flow control information generation section 311 selects the throughput of the user terminal 40-1 for the throughput of group 1. Likewise, if the throughput of the user terminal 40-4 is smaller than the throughput of the user terminal 40-5, the flow control information generation section 311 selects the throughput of the user terminal 40-4 for the throughput of group 2.

Next, the flow control information generation section 311 calculates the buffer size (allowable data amount) of each group by dividing, proportionally, the overall free buffer size of the RLC buffer by the above two throughputs. For example, if the throughput of group 1 is twice the throughput of group 2, the free buffer size is prorated to 2:1, which are calculated as the respective buffer sizes of groups 1 and 2.

For example, the flow control information generation section 311 transmits the flow control information to the central node 31 in, for example, the format shown in FIG. 8. If the flow control information pertaining to group 1 shown in FIG. 6 is notified to the central node 31, "1" is set to "UEG number" in FIG. 8, and the buffer size for group 1 calculated above is set to "Desired buffer size for the data radio bearer".

Note that the flow control information may include the data rate, in addition to or instead of the above buffer size. For example, the flow control information generation section 311 may set the above-described throughput of each group for the data rate of each group. For example, in the format shown in FIG. 8, each group's data rate (throughput) may be set to "Desired Data Rate". As described above, the flow control information generation section 311 calculates buffer sizes on a per group basis, or calculates data rates on a per group basis, as allowable data amounts, and notifies these to the central node 31.

Note that, since no information about the group members (user terminals 40) is included in the format shown in FIG. 8, the flow control information generation section 311 notifies this information to the central node 31, apart from the flow control information. To be more specific, the flow control information generation section 311 notifies a UEG number for identifying a group, and identifiers (IDs) that specify the user terminals 40 included in the group and subject to processing in the RLC section 302, to the distributed node 32, to the central node 31.

Alternatively, the flow control information generation section 311 may include details about the groups in the flow control information. To be more specific, the flow control information generation section 311 may transmit the flow control information to the central node 31 in, for example, the format shown in FIG. 9.

For example, when notifying the flow control information pertaining to group 1 shown in FIG. 6 to the central node 31, "1" is set to "UEG number", and "3" is set to "number of UE", in FIG. 9. Furthermore, the identifiers of the user terminals 40-1 to 40-3 are set to "UE ID #1" to "UE ID #n". Also, the data rate for each group, which has been described above, can be set to "Data rate Ind. UEG" in FIG. 9. As for the UE IDs for identifying the user terminals 40, IP addresses, media access control (MAC) addresses, and/or the like can be used.

Alternatively, the flow control information generation section 311 may transmit flow control information in the format shown in FIG. 9, or transmit flow control information in the format shown in FIG. 8, depending on the situation. For example, the distributed node 32 transmits information represented in the format shown in FIG. 9, as "configuration information", when the distributed node 32 starts operating. By transmitting this information, the central node 31 associates the group IDs and the UE IDs of user terminals 40 belonging to each group, with each other, and stores these.

If there is a change in the grouping while the system is operating, or if a user terminal 40 in the system is removed or a user terminal 40 is added to the system, the central node 31 may transmit the information shown in FIG. 9 again. For example, the core network 10, the central node 31, and the distributed node 32 to use are assigned per bearer. However, when there is a change in the radio environment due to the movement of a user terminal 40 and/or the like, a bearer may be assigned to a central node 31 and a distributed node 32 that are different from those initially assigned. In this case, the distributed node 32 retransmits the allowable data amount of each group and the grouping configuration for user terminals 40, to the central node 31, in the format shown in FIG. 9.

If there is no change in the grouping configuration and/or the like, the distributed node 32 may transmit the allowable data amount of each group in the format shown in FIG. 8.

Figure 10:
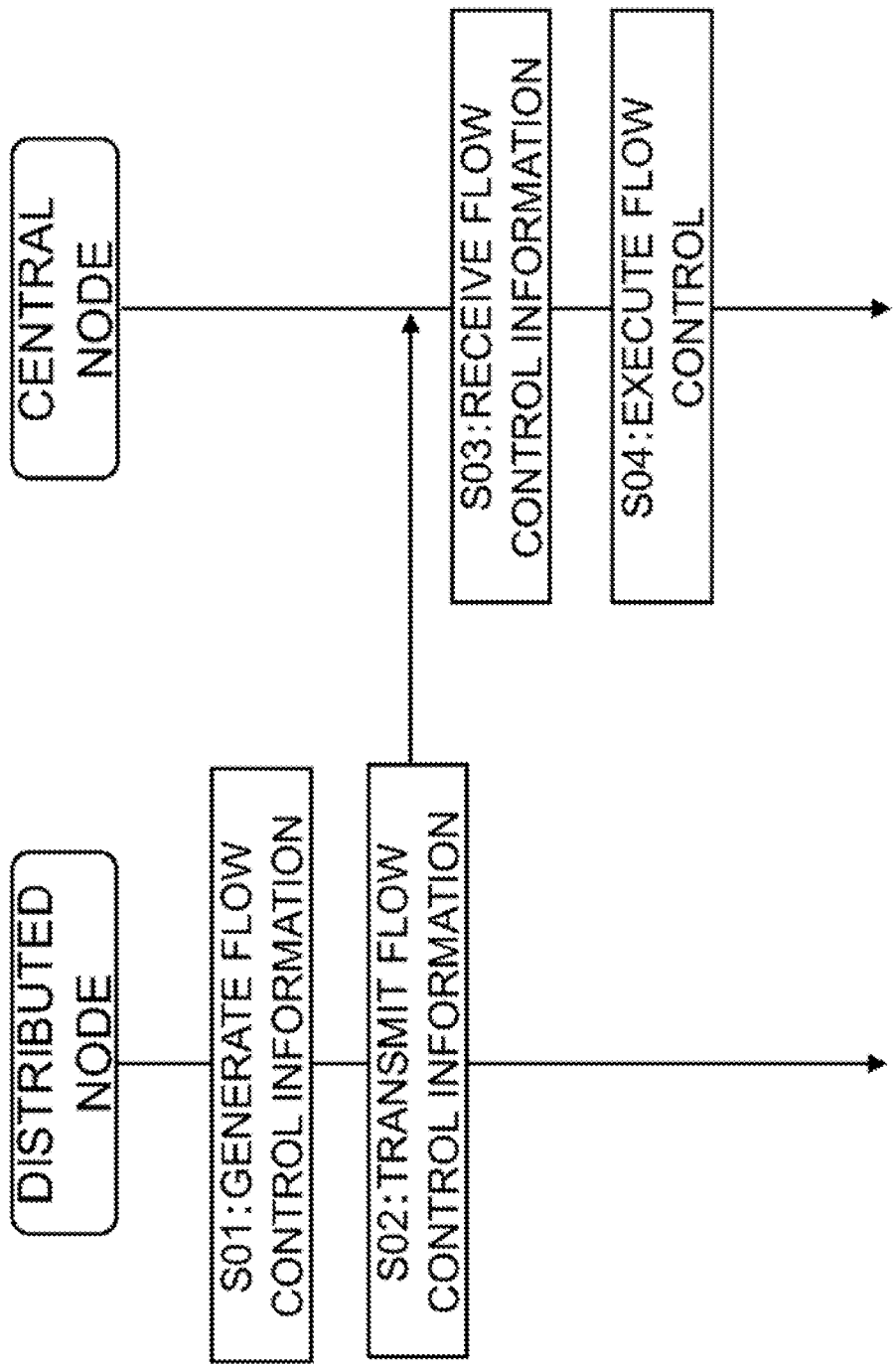
FIG. 10 is a sequence diagram to show an example of the operation of a radio communication system according to the first example embodiment.

Following this, the operation of the radio communication system according to the first example embodiment will be described. FIG. 10 is a sequence diagram to show an example of the operation of the radio communication system according to the first example embodiment.

The distributed node 32 generates flow control information based on the situation of the RLC buffer (step S01).

The distributed node 32 transmits the generated flow control information, to the central node 31 (step S02). Note that, when the flow control information generation section 311 of the distributed node 32 wants to stop distributing data with respect to a specific bearer, the flow control information generation section 311 sets "0" to the allowable data amount (buffer size, data rate). That is, to stop transmitting data to the bearers that are assigned respectively to the user terminals 40 belonging to each group, the distributed node 32 sets a predetermined value for the allowable data amount. The central node 31 stops forwarding data to the bearers assigned to a plurality of user terminals 40 that belong to groups where the predetermined value is set for the allowable data amount.

The central node 31 receives the flow control information (step S03), and executes the flow control based on this flow control information (step S04). To be more specific, the central node 31 controls the flow of downlink data with the allowable data amount included in flow control information as an upper limit.

For example, consider a case where grouping is performed as shown in FIG. 6 and the central node 31 receives the allowable data amount (buffer size, data rate, etc.) of each group. In this case, for group 1, the central node 31 transmits data to the bearers assigned respectively to the user terminals 40-1 to 40-3, according to the allowable data amount.

For example, when buffer sizes are included in the flow control information as allowable data amounts, the central node 31 transmits data until the total value of the amounts of data transmitted to the user terminals 40-1 to 40-3 reaches the buffer size of group 1. When the amount of data transmitted to the bearers assigned to the user terminals 40 that belong to group 1 reaches the buffer size of group 1, the central node 31 starts transmitting data, again, after a predetermined period passes.

Alternatively, when data rates are included in the flow control information as allowable data amounts, the central node 31 transmits data for the bearers assigned respectively to the user terminals 40-1 to 40-3 at data rates lower than those data rates.

Figure 11:
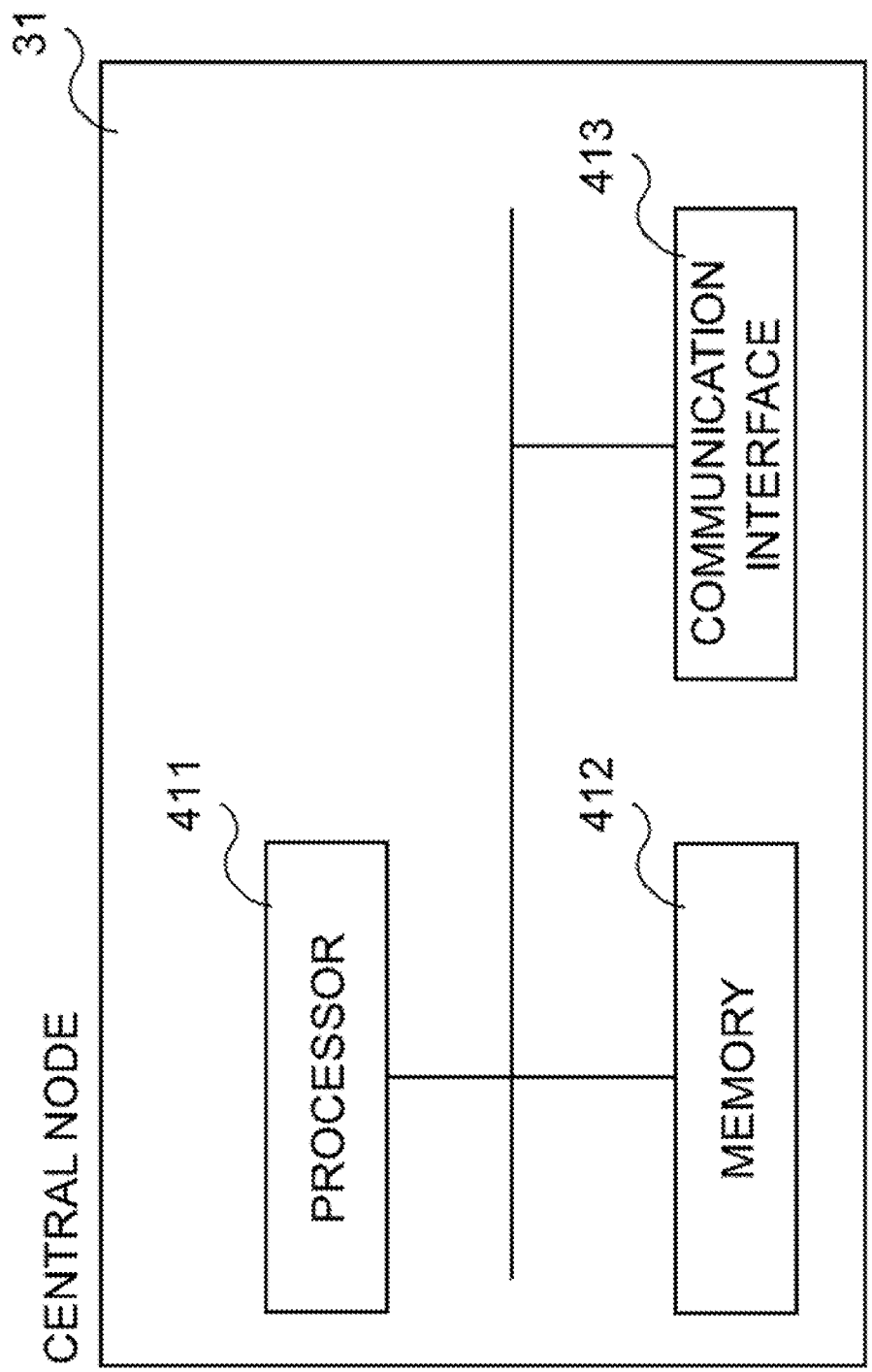
FIG. 11 is a diagram to show an example of a hardware structure of a central node.

Next, the hardware of the central node 31 and the distributed node 32 will be described. FIG. 11 is a diagram to show an example of the hardware structure of the central node 31.

The central node 31 has the structure shown as an example in FIG. 11. For example, the central node 31 includes a processor 411, a memory 412, a communication interface 413, and so on. Components such as the processor 411 are connected by internal buses and/or the like, and are configured to be able to communicate with each other.

However, the structure shown in FIG. 11 is not intended to limit the hardware structure of the central node 31. The central node 31 may include hardware not shown. Furthermore, the number of processors 411 and the like included in the central node 31 is not limited to the example shown in FIG. 11, and, for example, a plurality of processors 411 may be included in the central node 31.

The processor 411 is a programmable device such as a central processing unit (CPU), a micro processing unit (MPU), and a digital signal processor (DSP). Alternatively, the processor 411 may be a device such as a field programmable gate array (FPGA) and an application specific integrated circuit (ASIC). The processor 411 runs a variety of programs including an operating system (OS).

The memory 412 is a random access memory (RAM), a read only memory (ROM), a hard disk drive (HDD), a solid state drive (SSD), and so forth. The memory 412 stores OS programs, application programs, various data, and so forth.

The communication interface 413 is a circuit, a module and/or the like for communicating with other devices. For example, the communication interface 413 includes a network interface card (NIC) and/or the like.

The functions of the central node 31 are implemented by a variety of processing modules. The processing module is implemented, for example, when the processor 411 runs programs stored in the memory 412. Furthermore, the programs can be recorded on a computer-readable storage medium. For the storage medium, a non-transitory medium such as a semiconductor memory, a hard disk, a magnetic recording medium, an optical recording medium and so forth can be used. That is, the present invention can be implemented in the form of a computer program product. In addition, the programs can be downloaded via a network, or can be updated using a storage medium storing the programs. Furthermore, the processing modules may be implemented by semiconductor chips.

Note that the hardware structure of the distributed node 32 can be made the same as that of the central node 31, and therefore its description will be omitted.

As described above, with the first example embodiment, downlink data for a plurality of bearers is buffered in the RLC section 302. At this time, the size of buffers provided in the RLC section 302 has a limit, and therefore flow control is implemented so that an appropriate amount of data is distributed from the central node 31 to the distributed node 32. That is, even when buffers for a plurality of bearers for a plurality of user terminals 40 are shared, the PDCP section 202 of the central node 31 according to the first example embodiment can distribute an appropriate amount of data to the distributed node 32.

That is, given a radio base station where a central node 31 and a distributed node 32 are included, and where the distributed node 32 requests the central node 31 to distribute and stop data based on, for example, the amount of transmission data that remains, the present disclosure provides a method for requesting data distribution for an appropriate amount of data or stopping data distribution. To be more specific, when allowable data amounts (allowable buffer sizes, upper-limit data rates, etc.) are notified from the distributed node 32 to the central node 31, the distributed node 32 divides a plurality of user terminals 40 that share the same buffer into groups, and allowable data amounts that apply in common to the user terminals 40 of each group are notified.

Example Alternation

Note that the structure, operation, and other features of the radio communication system described with the example embodiment are simply examples, and are not intended to limit the system's structure and/or the like. For example, the above example embodiment has been described on the assumption that the radio base station is a 5G radio base station (gNodeB), but the present disclosure may be applied to radio base stations for use in 5G or later schemes.

Alternatively, the present disclosure may be applied to a dual connectivity system with a macro base station (MeNB)/small base station (SeNB).

Although a case has been described with the above example embodiment where the allowable data amount of each group is determined based on throughput, the flow control information generation section 311 may determine (change, adjust, etc.) allowable data amounts based on information related to the buffer which a plurality of user terminals share. For example, the flow control information generation section 311 may determine allowable data amounts based on information related to remaining data (for example, the amount of data that remains, the length of time data stays, etc.), for each group. To be more specific, when the amount of data that remains in a whole group (buffer occupancy) is greater than a threshold, or when the length of time data has stayed is longer than a threshold, the flow control information generation section 311 may notify smaller values than the calculated allowable data amounts to the central node 31.

Although a case has been described with the above example embodiment where flow control is implemented based on the allowable data amount for groups notified from the distributed node 32, the central node 31 may use information other than the allowable data amount, for the flow control. For example, the central node 31 may perform flow control based on the amount of data that remains, or the length of time data stays, in the buffers of the PDCP section 202. For example, the central node 31 may preferentially process a bearer in which a large amount of data remains, or a bearer in which data has stayed for a long time, in the buffers of the PDCP section 202 (may preferentially distribute data).

A case has been described with the above example embodiment where flow control information is exchanged between the central node 31 and the distributed node 32 accommodated under the same second radio base station 30, the flow control information may be transmitted to a central node 31 installed in a different second radio base station 30. In this case, the X2 interface is defined as an interface for distribution to the other node (radio base station), and flow control information may be transmitted and received between the radio base stations via the X2 interface.

According to the example embodiment, information related to groups is notified from the RLC section 302 of the distributed node 32 to the PDCP section 202 of the central node 31, but it is equally possible to notify, instead of the above notification, information related to user terminals 40, from the central node 31 to the distributed node 32. For example, the PDCP section 202 of the central node 31 may identify the user terminals 40, the bearers and so forth that are subject to processing in the RLC section 302 of each distributed node 32, and notify the user equipment groups (UEGs) to the RLC section 302 of the distributed node 32. That is, the central node 31 may divide the user terminals 40 into groups, and notify the result of this grouping to the distributed node 32.

Although the example embodiment has been presented on the assumption that one group includes a plurality of user terminals 40, one user terminal 40 may be included in one group.

The above description has made the industrial applicability of the present invention clear, but the present invention can be suitably applied to, for example, a mobile communication system to include a central node CU and a distributed node DU.

Part or all of the example embodiments can be described as, but not limited to, the following supplementary notes.
(Supplementary Note 1)

A radio base station (100, 30), comprising:

a central node (101, 31), which at least implements the functions of a Packet Data Convergence Protocol (PDCP) layer; and a distributed node (102, 32), which at least implements the functions of a Radio Link Control (RLC) layer;

wherein the distributed node (102, 32) transmits flow control information for performing flow control per each group of a plurality of user terminals (40), to the central node (101, 31); and the central node (101, 31) performs the flow control of data to be transmitted to the bearers assigned to the plurality of user terminals (40) belonging to the each group, based on the flow control information.
(Supplementary Note 2)

The radio base station (100, 30) according to supplementary note 1, wherein the distributed node (102, 32) includes information about the amount of data, which the group of the plurality of user terminals (40) can accept, in the flow control information, as an allowable data amount.
(Supplementary Note 3)

The radio base station (100, 30) according to supplementary note 2, wherein:

in a case when stopping transmitting data to the bearers assigned respectively to the plurality of user terminals (40) belonging to the each group, the distributed node (102, 32) sets a predetermined value for the allowable data amount; and the central node (101, 31) stops forwarding data to the bearers assigned to the plurality of user terminals (40) belonging to the each group in which the predetermined value is set for the allowable data amount.
(Supplementary Note 4)

The radio base station (100, 30) according to supplementary note 2 or 3, wherein the distributed node (102, 32) determines the allowable data amount based on information related to a buffer which the plurality of user terminals (40) share.
(Supplementary Note 5)

The radio base station (100, 30) according to any one of supplementary notes 2 to 4, wherein the distributed node (102, 32) calculates a buffer size for the each group or a data rate for the each group, as the allowable data amount.
(Supplementary Note 6)

The radio base station (100, 30) according to supplementary note 4, wherein the distributed node (102, 32) divides the plurality of user terminals (40) sharing the buffer into groups, based on types of the user terminals (40), and generates the flow control information, for the each group.
(Supplementary Note 7)

The radio base station (100, 30) according to any one of supplementary notes 1 to 6, wherein the distributed node (102, 32) transmits the flow control information to the central node (101, 31) installed in another radio base station (100, 30).
(Supplementary Note 8)

The radio base station according to supplementary note 7 (100, 30), wherein the distributed node (102, 32) transmits the flow control information to the another radio base station (100, 30), through an X2 interface.
(Supplementary Note 9)
The radio base station according to any one of supplementary notes 1 to 8 (100, 30), wherein the distributed node (102, 32) transmits the flow control information to the central node (101, 31), through an F1 interface.
(Supplementary Note 10)
A radio communication system, comprising:
a plurality of user terminals (40); and
a radio base station (100, 30), which provides radio connections to the plurality of user terminals (40);
wherein the radio base station (100, 30) comprises:
a central node (101, 31), which at least implements the functions of a Packet Data Convergence Protocol (PDCP) layer; and
a distributed node (102, 32), which at least implements the functions of a Radio Link Control (RLC) layer;
wherein the distributed node (102, 32) transmits flow control information for performing flow control per each group of one or more user terminals (40), to the central node (101, 31); and
the central node (101, 31) performs flow control of data to be transmitted to the bearers assigned to the one or more user terminals (40) belonging to the each group, based on the flow control information.
(Supplementary Note 11)
A flow control method in a radio communication system comprising a central node (101, 31), which at least implements the functions of a Packet Data Convergence Protocol (PDCP) layer, and a distributed node (102, 32), which at least implements the functions of a Radio Link Control (RLC) layer, the method comprising the steps of:
transmitting flow control information for performing flow control per each group of a plurality of user terminals (40), to the central node (101, 31); and
performing the flow control of data to be transmitted to the bearers assigned to the plurality of user terminals (40) belonging to the each group, based on the flow control information.
(Supplementary Note 12)
A non-transitory computer-readable storage medium storing a program for causing a computer (411) mounted on a distributed node (102, 32), which at least implements the functions of a Radio Link Control (RLC) layer, to execute the processes of:
generating flow control information for performing flow control per each group of a plurality of user terminals (40); and
transmitting the generated flow control information to a central node (101, 31), which at least implements the functions of a Packet Data Convergence Protocol (PDCP) layer.
Note that the forms of supplementary notes 10 to 12 can be expanded to the forms of supplementary notes 2 to 9, similar to the form of supplementary note 1.
Although example embodiments of the present invention have been described above, the present invention is by no means limited to these example embodiments. It will be understood by those of ordinary skill in the art that these example embodiments are simply examples, and that a variety of changes can be made without departing from the scope and spirit of the present invention.
This application claims priority based on Japanese Patent Application No. 2019-105848 filed on Jun. 6, 2019, the entire disclosure of which is incorporated herein.

What is claimed is:

1. A radio base station comprising:
a central node, which at least implements functions of a Packet Data Convergence Protocol (PDCP) layer, and
a distributed node, which at least implements functions of a Radio Link Control (RLC) layer;
wherein the distributed node transmits flow control information for performing flow control for each of a plurality of groups of a plurality of user terminals sharing a same buffer, to the central node, the flow control information including, for each group, first information about an allowable data amount for the group, and second information related to the group, the second information including at least a plurality of identifiers of the plurality of user terminals belonging to the group,
the central node performs the flow control of data to be transmitted to bearers respectively assigned to the plurality of user terminals belonging to each group, based on the flow control information, and
the central node determines whether there is a change in grouping of the user terminals based on the second information, and performs the flow control based on the change.

2. The radio base station according to claim 1, wherein:
in a case when stopping transmission of the data to the bearers respectively assigned to the plurality of user terminals belonging to each group, the distributed node sets a predetermined value for the allowable data amount, and
the central node stops the transmission of the data to the bearers respectively assigned to the plurality of user terminals belonging to each group in which the predetermined value is set for the allowable data amount.

3. The radio base station according to claim 1, wherein the distributed node determines the allowable data amount based on information related to a buffer which the plurality of user terminals share.

4. The radio base station according to claim 1, wherein the distributed node calculates a buffer size for each group or a data rate for each group, as the allowable data amount.

5. The radio base station according to claim 3, wherein the distributed node divides the plurality of user terminals sharing the buffer into the plurality of groups, based on types of the user terminals, and generates the flow control information for each group.

6. The radio base station according to claim 1, wherein the distributed node transmits the flow control information to the central node installed in another radio base station.

7. A radio communication system comprising:
a plurality of user terminals; and
a radio base station, which provides radio connections to the plurality of user terminals;
wherein the radio base station comprises:
a central node, which at least implements functions of a Packet Data Convergence Protocol (PDCP) layer; and
a distributed node, which at least implements functions of a Radio Link Control (RLC) layer,
wherein the distributed node transmits flow control information for performing flow control for each of a plurality of groups of a plurality of user terminals sharing a same buffer, to the central node, the flow control information including, for each group, first information about an allowable data amount for the group, and second information related to the group, the second information including at least a plurality of identifiers of the plurality of user terminals belonging to the group, the central node performs the flow control of data to be transmitted to bearers respectively assigned to the plurality of user terminals belonging to each group, based on the flow control information, and the central node determines whether there is a change in grouping of the user terminals based on the second information, and performs the flow control based on the change.

8. A flow control method in a radio communication system comprising a central node, which at least implements functions of a Packet Data Convergence Protocol (PDCP) layer, and a distributed node, which at least implements functions of a Radio Link Control (RLC) layer, the method comprising steps of:

transmitting, by the distributed node, flow control information for performing flow control for each of a plurality of groups of a plurality of user terminals sharing a same buffer, to the central node, the flow control information including, for each group, first information about an allowable data amount for the group, and second information related to the group, the second information including at least a plurality of identifiers of the plurality of user terminals belonging to the group;

performing, by the central node, the flow control of data to be transmitted to bearers respectively assigned to the plurality of user terminals belonging to each group, based on the flow control information, wherein the central node determines whether there is a change in grouping of the user terminals based on the second information, and performs the flow control based on the change.

* * * * *